Figure 1:
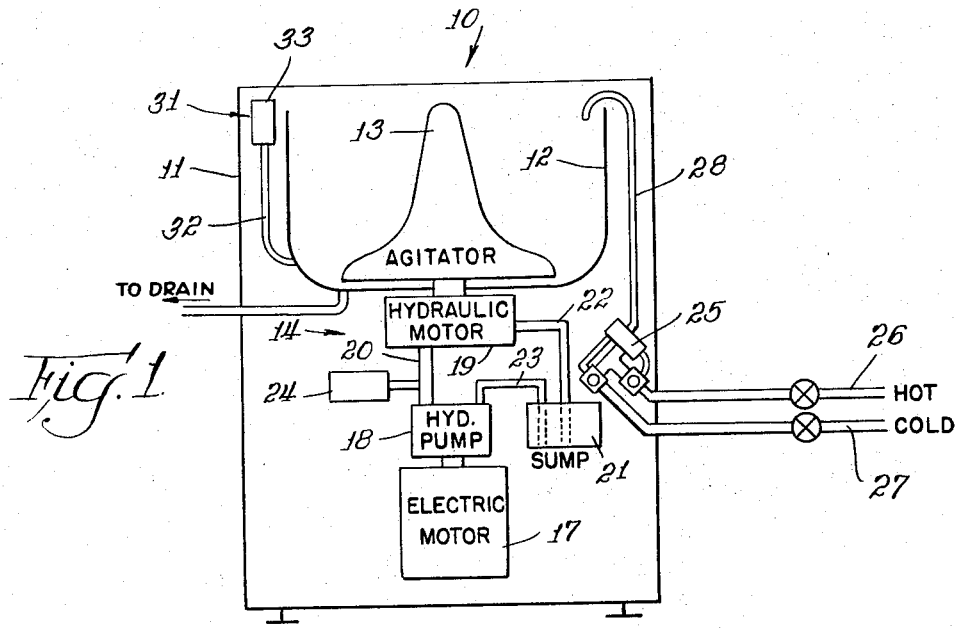

Dec. 26, 1967 R. H. HAAS 3,359,766
AUTOMATIC FLUID LEVEL DEVICE
Filed Dec. 19, 1966

Inventor
Ronald H. Haas
By Robert L. Zieg
Atty.

United States Patent Office 3,359,766
Patented Dec. 26, 1967

3,359,766
AUTOMATIC FLUID LEVEL DEVICE
Ronald H. Haas, Lansing, Mich., assignor to Borg-Warner Corporation, Chicago, Ill., a corporation of Illinois
Filed Dec. 19, 1966, Ser. No. 602,694
10 Claims. (Cl. 68—207)

This invention relates to laundry apparatus and more particularly to automatic liquid level control means therefor.

One of the problems of the present automatic washing machine operation is the selection of the proper water level during agitation. One method presently used is to fill the tub to any number of predetermined levels by means of a pre-position water level switch.

Another method is to fill anywhere between a predetermined maximum and minimum by an infinite control water level switch.

Still a third method is to use a timer to admit liquid for a pre-set time interval again to fill to one of a series of predetermined levels.

The problem posed by the present systems is that they afford a possibility of operator error, permitting waste of hot water, detergent and other additives or alternatively allowing damaging overload to all drive line components. If the water level is set for more water than is actually required, the housewife uses an excess amount of water and detergent and any other additive whose strength is based on its addition to a proportionate amount of water. If the water level is set too low for the particular load, the clothes pack against the agitator and overload the electric motor as well as all drive line components which results in premature failures.

The decision as to which water level should be used is not an easy one because of the variables involved e.g., size of load, type of load, etc. It is obvious that 10 pounds of towels will require more water than 10 pounds of hankerchiefs to maintain the same agitator torque.

The present invention overcomes these objections by providing a washing machine incorporating an automatic water level control system which removes the chance of error by eliminating the judgment factor of the operator.

With the advent of hydrostatic transmissions in automatic washing machines, it is possible to sense the torque of the wash load through the agitator motor fluid pressure. The pressure at the motor in the fluid drive system increases as the agitator torque increases.

The present invention utilizes a simple pressure sensing switch associated with the fluid drive system set for the maximum desired agitator torque. When the pre-set pressure level is exceeded a water fill valve is turned on thereby adding liquid until the torque decreases to the desired operating level. At this time the pressure sensing switch circuit would open and shut off the water fill valve and thereby operate the washing machine at its optimum water level. This would supply the correct water level to operate the washing machine efficiently and economically.

Minimum and maximum water level switches are incorporated respectively to provide a minimum pre-fill prior to agitation and a liquid shut-off to prevent overflow. A manual override switch is further included to allow the operator to wash a light load with full water in special circumstances, for example, heavily soiled clothes. This will allow the water level to be set anywhere between the automatic shut-off and full water level for any load.

It is, therefore, an object of the present invention to provide a washing machine having an automatic liquid level control to automatically provide the correct amount of liquid necessary for each individual load.

It is a further object of the present invention to provide a washing machine with an automatic liquid level control which affords substantial savings in water, detergent and other additives by supplying only the necessary amount of liquid required by each particular load.

It is a further object of the present invention to provide an automatic liquid level control which can be used to safeguard the motor and drive line components of a washing machine by automatically supplying the proper amount of liquid for a particular load to avoid an excessive agitator torque.

Figure 2:
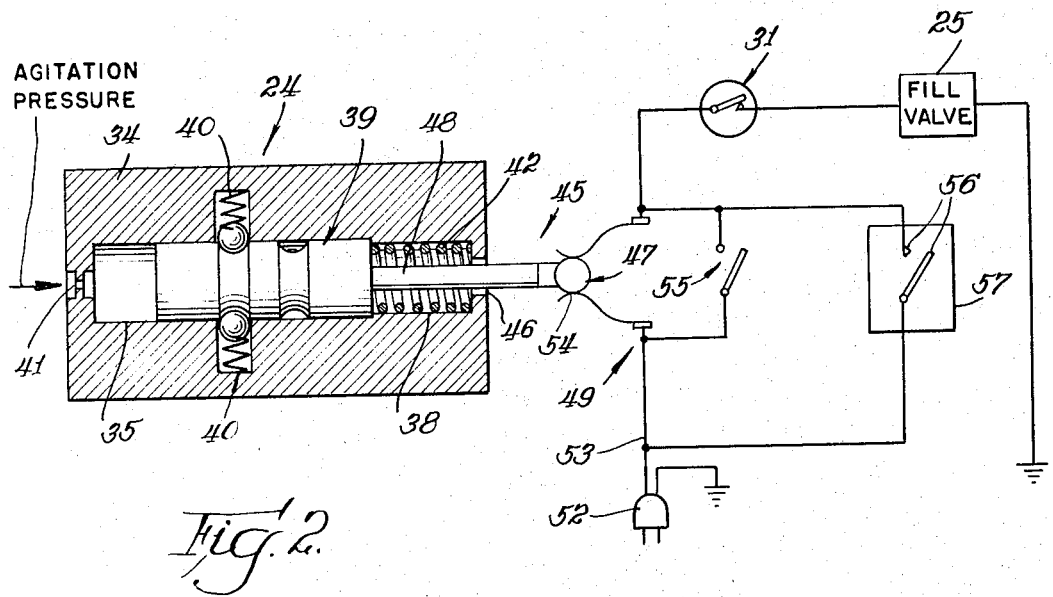

This invention consists of the novel constructions, arrangements and devices to be hereinafter described and claimed for carrying out the above stated objects and such other objects as well be apparent from the following description of preferred forms of the invention, illustrated with reference to the accompanying drawings wherein:

FIGURE 1 is a schematic view of a washing machine and liquid level control means therefor; and FIGURE 2 is a plan view in schematic of the fluid pressure sensing switch including a circuit diagram of means cooperating with the pressure sensing switch.

Although this invention is applicable to any type of machine for the liquid treatment of materials, for purposes of illustration the automatic liquid level control is shown in connection with an automatic washing machine of the vertical axis type utilizing an oscillatory agitator. This arrangement is purely for purposes of illustration of the inherent advantage of the invention and should not be considered as a limitation of the scope of its application.

A washing machine 10 is shown in FIGURE 1 with a support structure 11 housing a container 12 into which are deposited the materials to be laundered plus the appropriate cleansing agents. An agitator 13 is mounted within the container 12 for actuation by fluid drive system 14. The fluid drive system 14 includes an electric motor 17 connected to drive a hydraulic pump 18 which supplies fluid pressure to a hydraulic motor 19 by means of a first fluid conduit 20. The hydraulic motor 19 exhausts fluid to a sump 21 through a second fluid conduit 22. Fluid is communicated from the sump 21 to hydraulic pump 18 through a third fluid conduit 23. The hydraulic motor 19 is operable associated with the agitator 13 to impart to it an oscillatory motion.

A fluid pressure sensing switch 24 is shown in fluid communication with the first fluid conduit 20 and senses the fluid pressure at the hydraulic motor 19 which is a function of the torque of the wash load.

A solenoid controlled fill valve 25 similar to those commonly known in the art, is shown connected to a hot water source 26 and a cold water source 27. The fill valve acts to communicate either hot water or cold water or, mixing both, warm water to the container 12 through fluid conduit 28.

A maximum liquid level switch 31 of the air column type is shown in FIGURE 1 but any of several common types may be used. A conduit 32 containing air is in fluid communication with the container 12 and a diaphragm-type pressure switch 33 such that as the liquid level in the container 12 increases, the air pressure in the conduit 32 increases until the predetermined maximum level is reached and the pressure in the conduit 32 is sufficient to trip the diaphragm-type switch 33.

FIGURE 2 shows the fluid pressure sensing switch 24 including a housing 34 defining a first bore 35 and a second bore 38 concentric with the first bore 35 and of slightly smaller diameter. A spool valve 39 is adapted to slide axially within the first bore 35 when acted on by the hydraulic motor fluid pressure. Detent means 40 are a fluid source; a hydraulic motor adapted to receive fluid pressure from said hydraulic pump and to drive said agitator, the fluid pressure in said drive system increasing as the torque required to drive said agitator increases.

4. A machine for liquid treatment of materials as in claim 2 in which said means for sensing the fluid drive pressure consists of a pressure sensing switch, including: valve means adapted to be actuated by said fluid pressure; biasing means adapted to urge said valve means against said fluid pressure; a conductive member associated with said valve means adapted to move in response to movement of said valve means.

5. A machine for liquid treatment of materials as in claim 2 in which said means for sensing fluid pressure includes: a fluid connection between said fluid drive system and said means for sensing fluid pressure; an orifice in said fluid connection whereby said orifice acts to damp any pressure pulsations and communicates only an average pressure level; means in fluid communication with said orifice responsive to said fluid pressure whereby said means are adapted to move in response to an increase or decrease in said fluid pressure; a conductive member operably associated with said pressure responsive means and adapted to move in response to movement of said pressure responsive means.

6. A machine for liquid treatment of materials as in claim 2 in which said means for sensing fluid pressure consists of a pressure sensing switch, including: a housing defining a first bore; valve means adapted to slide within said bore in response to said fluid pressure; detent means within said housing adapted to engage said valve means; biasing means adapted to urge said valve means against said fluid pressure; a conductive member associated with said valve means adapted to move in response to movement of said valve means.

7. A washing machine including: a container for materials to be washed; agitation means in said container; a fluid drive system connected to said agitation means including a source of fluid pressure, the fluid pressure in said drive system increasing as the torque required to drive said agitation means increases; means associated with said drive system for sensing said fluid pressure; means for introducing an additional amount of liquid into said container in response to said fluid pressure.

8. A washing machine as in claim 7 in which said means for introducing an additional amount of liquid into said container in response to said fluid pressure includes: a liquid supply source; an electric circuit; a source of electrical energy connected to said electric circuit; electrically controlled valve means in said circuit associated with said liquid supply source to introduce liquid into said container when energized; a normally open electrical switch in said circuit adapted to be contacted by said pressure sensing means thereby activating said electrically controlled valve means.

9. A washing machine as in claim 7 including means for introducing a predetermined minimum amount of liquid into said container.

10. A washing machine as in claim 7 including means limiting said additional amount of liquid introduced into said container to a predetermined maximum value.

References Cited

UNITED STATES PATENTS

| | | | |
|---|---|---|---|
| 2,911,811 | 11/1959 | Clark | 68—12 |
| 2,955,448 | 10/1960 | Olthuis | 68—12 |
| 3,065,618 | 11/1962 | Cobb et al. | 68—12 |
| 3,106,081 | 10/1963 | Mitchell | 68—12 |
| 3,195,327 | 7/1965 | Cobb | 68—12 |
| 3,242,703 | 3/1966 | Brundage | 68—23 |
| 3,316,569 | 5/1967 | Brenner et al. | 68—12 X |

WILLIAM I. PRICE, *Primary Examiner.*